(12) United States Patent
Oh

(10) Patent No.: US 6,418,629 B1
(45) Date of Patent: Jul. 16, 2002

(54) ROTATING ANGLE MEASURING DEVICE AND METHOD FOR ROTARY OBJECT

(75) Inventor: Yeon-Taek Oh, Yongin (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 78 days.

(21) Appl. No.: 09/629,855

(22) Filed: Aug. 1, 2000

(30) Foreign Application Priority Data

Jan. 26, 2000 (KR) .......................................... 2000-3628

(51) Int. Cl.$^7$ ............................................... G01B 21/22
(52) U.S. Cl. ......................................................... 33/1 PT
(58) Field of Search ................................. 33/1 N, 1 PT

(56) References Cited

U.S. PATENT DOCUMENTS

| | | | |
|---|---|---|---|
| 5,548,193 A | | 8/1996 | Lee et al. |
| 5,689,892 A | * | 11/1997 | Beckingham ................ 33/1 N |
| 5,794,356 A | * | 8/1998 | Raab .......................... 33/1 PT |
| 5,887,353 A | * | 3/1999 | Beckingham ................ 33/1 N |
| 6,976,266 | * | 6/2000 | Beckingham et al. ........ 33/1 N |

* cited by examiner

*Primary Examiner*—G. Bradley Bennett
(74) *Attorney, Agent, or Firm*—Larson & Taylor PLC

(57) ABSTRACT

A rotating angle measuring device for a rotary object includes a holder mounted detachably to the object so that the holder is rotated together with the object; a rotating angle sensor coupled to the holder and having a shaft rotated relative to the holder; a level coupled to the shaft and having an initial value as a datum; and an operation part which rotates the shaft. A rotating angle of the shaft is measured by rotating the shaft using the operation part until the changed value of the level due to the rotation of the object is returned to the initial value, thereby determining a rotating angle of the object. A rotating angle measuring method includes the steps of mounting a rotating angle sensor and a level to the object, the level being coupled to a shaft of the sensor and rotated with the shaft; setting an initial value of the level; rotating the object at a target rotating angle; returning the changed value of the level due to the rotating step to the initial value by rotating the level; and measuring a practical rotating angle of the object by measuring with the sensor the rotating angle of the shaft during the returning step. The method further comprises a compensating step after the measuring step, in which the practical rotating angle of the object is analyzed and a deviation between the target rotating angle and the practical rotating angle is calculated and compensated for.

8 Claims, 11 Drawing Sheets

ROTATING ANGLE MEASURING DEVICE AND METHOD FOR ROTARY OBJECT

BACKGROUND OF THE INVENTION

1) Field of the Invention

The present invention relates to a rotating angle measuring device and method for a rotary object and, more particularly, to a rotating angle measuring device and method for a rotary object by which a rotating angle of a rotary object can be measured accurately and an error in the rotating angle can be compensated for.

2) Description of Related Art

Generally, an autocollimator 1 and a polygon mirror base 2 are used for measuring an accuracy of a rotating angle, which will be described hereinafter with reference to FIG. 1.

As shown in FIG. 1, a plurality of reflecting mirrors 3 are formed symmetrically on the outer circumference of the polygon mirror base 2. Normals l, l' of the reflecting mirrors 3 which are adjacent to each other meet at a rotating center R of the polygon mirror base 2 at a predetermined division angle α.

Such a polygon mirror base 2 is disposed on a rotary object like a link of a robot, etc., a rotating angle of which should be measured accurately. In this case, the rotating center R of the polygon mirror base 2 should be located in alignment with a rotating axis of the link of the robot. The autocollimator 1 emits a measuring beam to the reflecting mirror 3 and receives the beam reflected from the mirror 3, thereby displaying a horizontal angle of the autocollimator 1 on a displaying part (not shown).

In an initial condition, the autocollimator 1 is mounted perpendicularly to the reflecting mirror 3 of the polygon mirror base 2 so that the horizontal angle of the autocollimator 1 is set to 0°. Then, the link of the robot is rotated several times by the division angle α of the polygon mirror base 2, and the autocollimator 1 emits the measuring beam to the reflecting mirror 3 at every rotation of the link so as to measure the horizontal angle of the autocollimator 1, thereby detecting whether the link rotates accurately by the division angle α of the polygon mirror base 2.

That is, if the link of the robot rotates precisely by the division angle α of the polygon mirror base 2, the horizontal angle of the autocollimator 1 is continuously measured at 0°. If not, the horizontal angle of the autocollimator 1 shows numerically the error of the rotating angle of the link.

By using the above method, an error of a rotating angle of a rotary object like a link of a robot, etc. can be measured and compensated so as to improve an operation accuracy of the rotary object.

However, in the conventional rotating angle measuring device comprising the autocollimator 1 and polygon mirror base 2 as described above, since the polygon mirror base 2 is producible only to the minimum division angle α of 5° due to the manufacturing limits of accuracy, etc., it is impossible that the conventional measuring device is applied to rotary objects which are used in high-precision works requiring a rotating angle under 5°.

Furthermore, in mounting the polygon mirror base 2 to the rotary object to be measured, it is so difficult to locate the rotating center R of the polygon mirror base 2 precisely in alignment with the rotating axis of the rotary object.

SUMMARY OF THE INVENTION

The present invention has been made in an effort to solve the above problems.

It is an objective of the present invention to provide a rotating angle measuring device and method for a rotary object by which a minute rotating angle of a rotary object can be measured accurately and an error of rotation is compensated for so that the rotary object can be applied to high-precision works.

To achieve the above objective, the present invention provides a rotating angle measuring device for measuring a rotating angle of a rotary object comprising: a holder mounted detachably to the rotary object so that the holder is rotated together with the rotary object; a rotating angle sensor coupled to the holder and having a shaft which is rotated relative to the holder; a level coupled to the shaft of the rotating angle sensor which provides an initial value as a datum for operation of the rotating angle sensor at an initial position of the rotary object; and an operation part which rotates the shaft of the rotating angle sensor. After rotation of the rotary object from the initial position to a second position, a rotating angle of the shaft is measured with the rotating angle sensor by rotating the shaft using the operation part until the changed value of the level caused by the rotation of the rotary object is returned to the initial value, thereby determining a rotating angle of the rotary object.

The holder preferably comprises a mounting plate which is attached to the rotary object, a supporting plate to which the rotating angle sensor is fixed, and a plurality of connecting bars which connect the supporting plate to the mounting plate.

The operation part preferably includes a worm which is provided to the holder, and a worm wheel which is toothed with the worm and which is coupled to the shaft of the rotating angle sensor so as to be rotated together with the shaft by rotation of the worm, the shaft passing through the center portion of the worm wheel.

A rotating plate, through which the shaft of the rotating angle sensor is passed, is attached to the worm wheel so as to be rotated together with the shaft by the driving of the worm and the worm wheel. The level is also mounted fixedly to the rotating plate.

A driving plate for rotating the worm and a knob protruded from a surface of the driving plate are provided to one end of the worm.

Preferably, the rotating angle sensor is a rotary encoder.

Also, the present invention provides a rotating angle measuring method for a rotary object comprising the steps of: mounting a rotating angle sensor and a level to the rotary object, with the level being coupled to a shaft of the rotating angle sensor and rotated together with the shaft; setting an initial value of the level at an initial position of the rotary object; rotating the rotary object at a target rotating angle from the initial position to a second position; returning the changed value of the level due to the rotating step to the initial value by rotating the level; and measuring a practical rotating angle of the rotary object from the initial to the second position by measuring with the rotating angle sensor the rotating angle of the shaft which is rotated together with the level during the returning step.

The rotating angle measuring method further comprises a compensating step after the measuring step, in which the practical rotating angle of the rotary object measured in the measuring step is analyzed and a deviation between the target rotating angle and the practical rotating angle is calculated and compensated for.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2B is a mechanism diagram of the robot in FIG. 2a;

DETAILED DESCRIPTION OF PREFERRED EMBODIMENTS

A preferred embodiment of the present invention will now be described in detail with reference to the accompanying drawings.

In this embodiment, a robot is applied as a rotary object, a rotating angle of which is measured by a measuring device and method according to the present invention.

Figure 1:
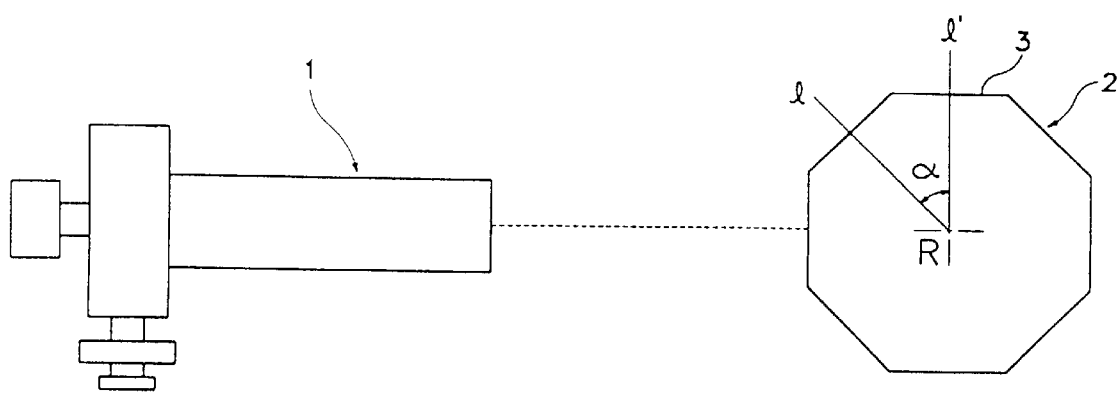
FIG. 1 is a front view of a conventional rotating angle measuring device for a rotary object.
Figure 2A:
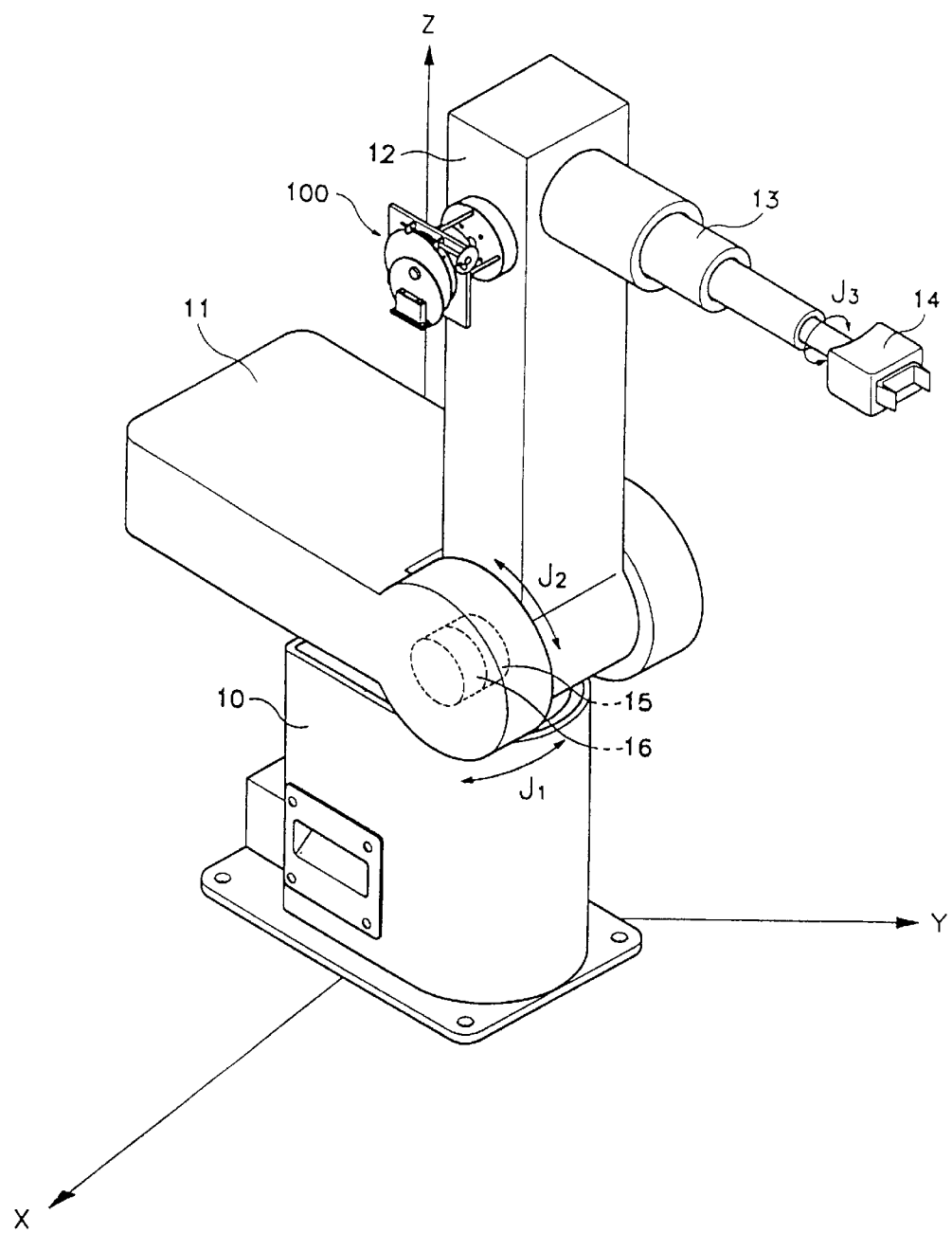
FIG. 2A is a perspective view illustrating a robot on which a rotating angle measuring device for a rotary object according to a preferred embodiment of the present invention is mounted.
Figure 2B:
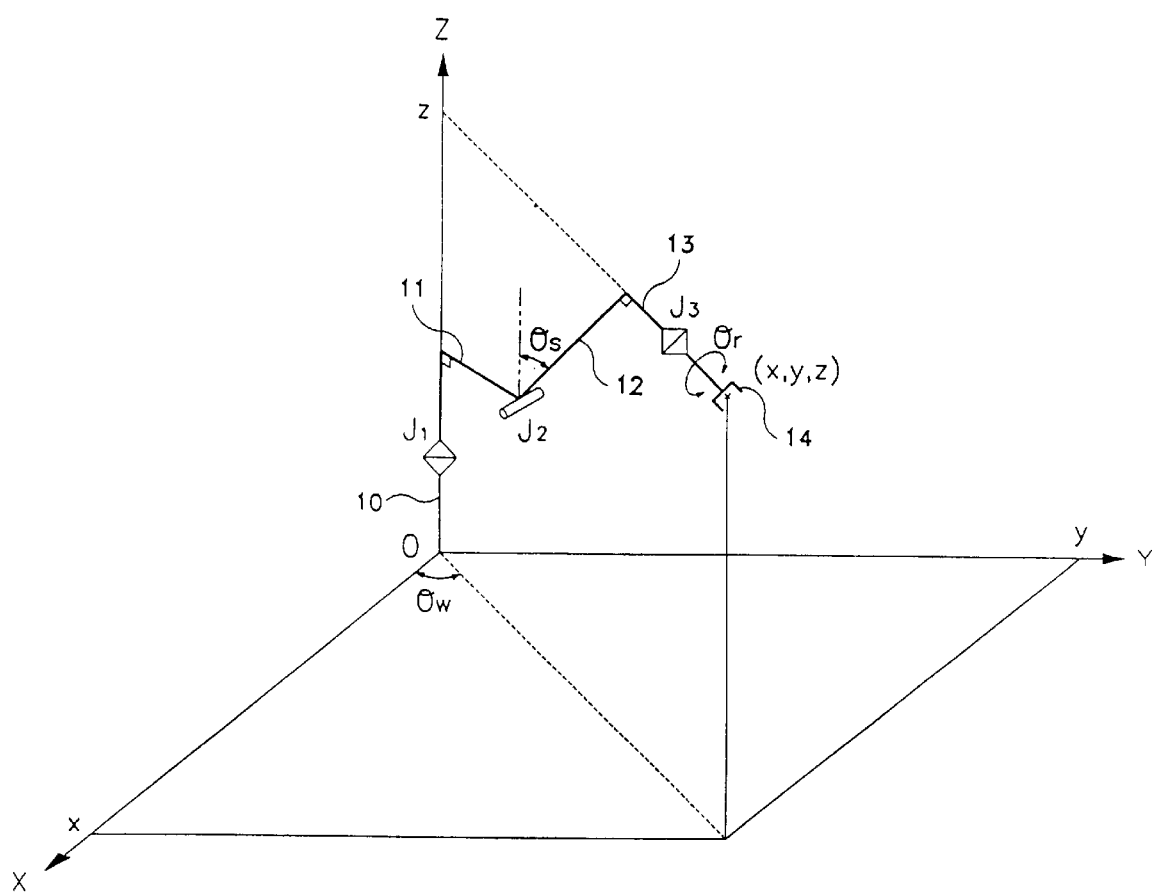

FIG. 2A is a perspective view illustrating a robot on which a rotating angle measuring device for a rotary object according to a preferred embodiment of the present invention is mounted, and FIG. 2B is a mechanism diagram of the robot in FIG. 2A.

As shown in the drawings, a position of an industrial robot is defined by a so-called base coordinate which has a X-axis, Y-axis and Z-axis. An origin point 0 of the base coordinate is set to the bottom of a base of the robot.

The robot comprises a base 10 having a vertical axis J1 and a first link 11 which is mounted on the base 10 and can be rotated at a predetermined angle $\Lambda w$ from the X-axis on the axis J1 of the base 10. Further, mounted to the front end of the first link 11 is a second link 12 which can be rotated at a predetermined angle $\theta s$ from the Z-axis on a horizontal axis J2 of the first link 11. Still further, a third link 13 to which an end effector 14 such as a gripper or a spray gun for coating is fixed is mounted perpendicularly to the front end of the second link 12. The end effector 14 can be rotated at a predetermined angle $\theta r$ on a central axis J3 of the third link 13. The front end position of the end effector 14 is defined by the coordinate of x, y and z which has variables of the rotating angles $\theta w$, $\theta s$ and $\theta r$ and the lengths of respective links 11, 12 and 13.

Mounted to the axis J2 of the first link 11 are a DC motor 15 for rotating the second link 12 and a rotary encoder 16 for measuring the rotating angle $\theta s$ of the second link 12, the DC motor 15 and rotary encoder 16 being controlled by a controller (not shown). In general, the rotary encoder 16 used in a robot has about two thousand slits (not shown) at one revolution of 360°, so a resolving power thereof is 0.18° (=360°/2000). In order to measure a considerably minute rotating angle of the robot used in a high-precision work and compensate an error, an encoder having more slits should be used. However, since the encoder becomes expensive as the number of the slits becomes large, the manufacturing cost of the robot increases.

To solve the above problem, a rotating angle measuring device 100 for a rotary object according to a preferred embodiment of the present invention is provided by which the rotating angle $\theta s$ of the second link 12 or the rotating angle $\theta r$ of the end effector 14 can be measured precisely. Measuring device 100 is detachably mounted to the robot, and will be described hereinafter with reference to FIG. 3 to FIG. 5.

As shown in the drawings, the rotating angle measuring device 100 for a rotary object of the present invention includes a holder 101 which is mounted to the robot, a rotating angle sensor 110 which is coupled to the holder 101 and measures practical rotating angles $\theta s$ and $\theta r$ of the robot, a level 140 which functions as a datum for operation of the angle sensor 110, and an operation part which operates the angle sensor 110.

Describing more in detail, the holder 101 comprises a mounting plate 102 which is attached to the robot, a supporting plate 103 to which the rotating angle sensor 110 is fixed, and a plurality of connecting bars 104 which connect the supporting plate 103 to the mounting plate 102.

The mounting plate 102 is formed in a circular shape, and a plurality of screws 105 are coupled to the mounting plate 102 in such a manner that the screws 105 protrude from a rear surface of the mounting plate 102. The screws 105 are inserted into inserting holes 12a having an appropriate size and position for each screw 105, the inserting holes 12a being generally generated on the link 12 in manufacturing the robot. By this insertion relationship between the screws 105 and the inserting holes 12a, the rotating angle measuring device 100 of the present invention can be stably mounted on the robot. For this purpose, many different screw holes 102a having various sizes are formed on the mounting plate 102, through which the corresponding screws 105 are coupled.

As the rotating angle sensor 110 is fixed to the supporting plate 103, a general angle sensor for measuring rotating angles, such as a rotary encoder or a potentiometer, can be employed. Preferably, a rotary encoder is used as the rotating angle sensor 110 in the present invention. This rotary encoder 110 comprises a cylindrical housing 111 forming an outer appearance and a flange portion 112 bent outwardly at one end of the housing 111. The rotary encoder 110 is fixed to the supporting plate 103 by passing the housing 111 of the rotary encoder 110 through a coupling hole 103a formed at the center of the supporting plate 103 and by screwing the coupling screws 118 into screw holes 112a and 103b which are formed on the flange portion 112 and the supporting plate 103 respectively.

Figure 5:
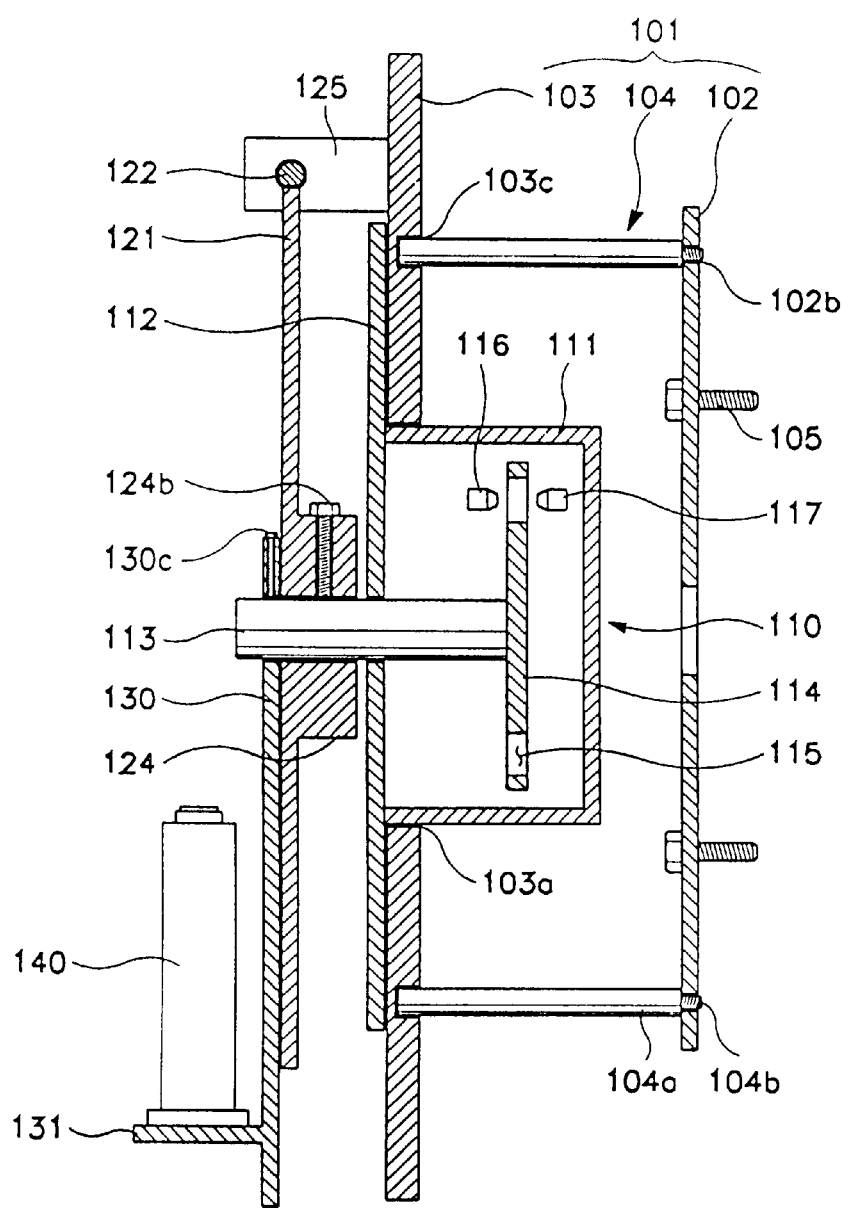
FIG. 5 is a sectional view of the rotating angle measuring device according to the present invention.

Also, as shown in FIG. 5, provided in the housing 111 of the rotary encoder 110 are a circular measuring plate 114 on which a plurality of slits 115 are formed, a shaft 113 one end of which is fixed to the center portion of the measuring plate 114 and the other end of which extends outside the housing 111, the shaft 113 being rotated relatively to the housing 111, and light emitting/receiving elements 116 and 117 which are respectively mounted to front/rear portions of the measuring plate 114 for measuring the rotating angle of the shaft 113. Preferably, the rotary encoder 110 applied to the rotating angle measuring device 100 of the present invention has over twenty thousand slits 115 on the measuring plate 114 at one revolution of 360°, so a resolving power thereof is under 0.018°(=360°/20000), whereby a high-precision measurement is enabled. The measurement value is displayed on a displaying part (not shown) which is connected to the rotary encoder 110. Since the rotary encoder 110 described above is a common apparatus, the description of the operational principle thereof will be omitted.

The connecting bar 104 for connecting the supporting plate 103 to the mounting plate 102 includes a large diameter portion 104a which is forcedly inserted into a fitting hole 103c formed on the rear surface of the supporting plate 103. The connecting bar 104 also includes a small diameter portion 104b which is screwed into a screw hole 102b formed on the mounting plate 102.

The operation part for operating the rotary encoder 110 includes a worm wheel 121 fixedly coupled to the encoder shaft 113, and a rod 123 which has a worm 122 toothed with the worm wheel 121 and which is mounted to the supporting plate 103.

Describing more in detail, a shaft hole 121a through which the encoder shaft 113 is passed is formed at the center portion of the worm wheel 121, and a boss 124 is protruded around the shaft hole 121a on the rear surface of the worm wheel 121. And, a screw hole 124a is formed on the outer circumferential surface of the boss 124 for communicating the shaft hole 121a with the outer circumferential surface of the boss 124 so that the encoder shaft 113 can be securely coupled into the shaft hole 121a of the worm wheel 121 by screwing a screw 124b into the screw hole 124a.

A pair of fixing members 125 through which the rod 123 is rotatably inserted are mounted on the upper front surface of the supporting plate 103.

A circular driving plate 123a for rotating the rod 123 is mounted to one end of the rod 123, and a knob 123b is provided at a portion of the driving plate 123a.

If a user rotates the knob 123b of the rod 123, the worm wheel 121 toothed with the worm 122 is also rotated. As a result, the encoder shaft 113 fixedly coupled into the shaft hole 121a of the worm wheel 121 is rotated, thus the measuring of the rotating angle is enabled, which will be described in detail later.

A circular rotating plate 130 is provided in front of the worm wheel 121, and a shaft hole 130a through which the encoder shaft 113 is passed is formed on the upper portion of the rotating plate 130. A screw hole 130b is formed on the outer circumferential surface of the rotating plate 130 for communicating the shaft hole 130a with the outer circumferential surface of the rotating plate 130 so that the encoder shaft 113 can be securely coupled into the shaft hole 130a of the rotating plate 130 by screwing a screw 130c into the screw hole 130b.

A holding plate 131 for supporting the level 140 which functions as a datum for operation of the rotary encoder 110 is mounted on the lower front surface of the rotating plate 130.

Preferably, an electronic level is applied as the level 140 so as to realize an exact and accurate measurement. The electronic level 140 includes a damping oscillator (not shown) which is disposed in the middle of two sensors (not shown). As an object to which the electronic level 140 is mounted becomes inclined, the position of the damping oscillator varies, and the sensors output the distance from the damping oscillator as a potential difference, thereby measuring the inclination degree of the object. By this operational principle, the electronic level 140 functions as a datum for operation of the rotary encoder 110, which will be described in detail later.

The electronic level 140 is fixed to the rotating plate 130 by screwing screws 132 into recesses 140a formed on a lower portion of the level 140 and screw holes 131a formed on the holding plate 131.

Figure 3:
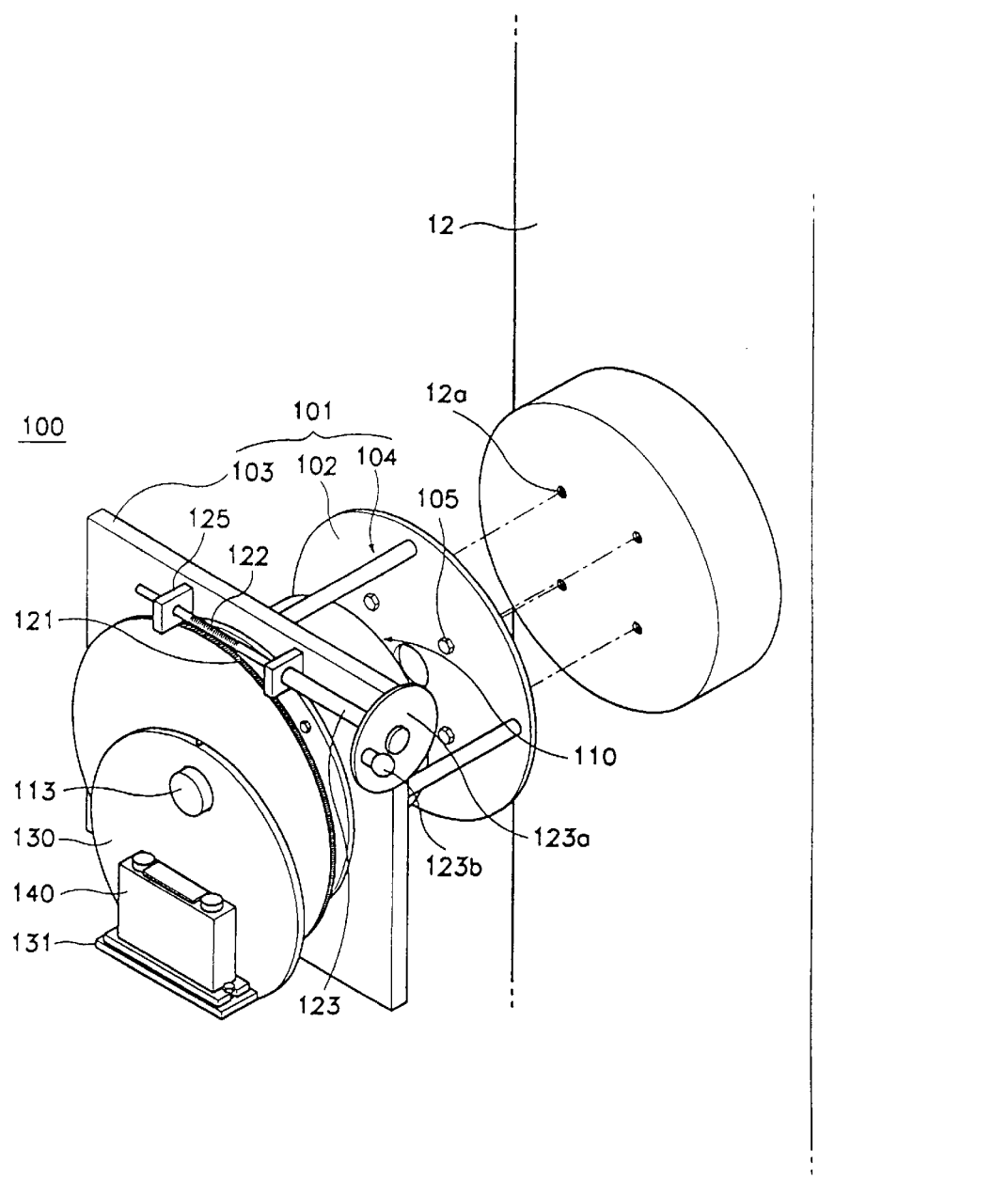
FIG. 3 is a perspective view of the rotating angle measuring device for a rotary object according to the present invention.
Figure 4:
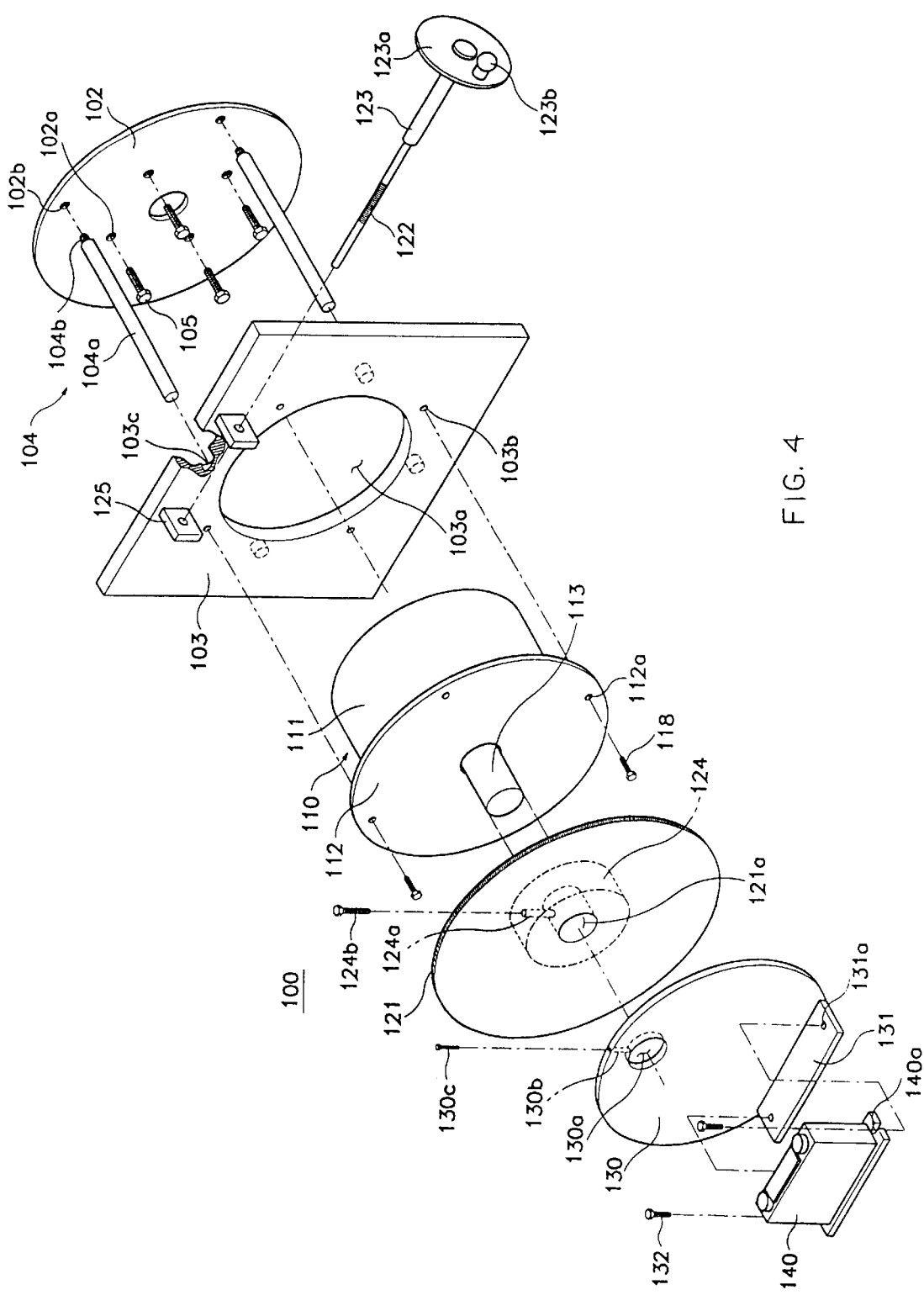
FIG. 4 is an exploded perspective view of the rotating angle measuring device according to the present invention.

A rotating angle measuring method using the device 100 of the present invention will be described hereinafter with reference to FIGS. 3 and 6.

Figure 6A:
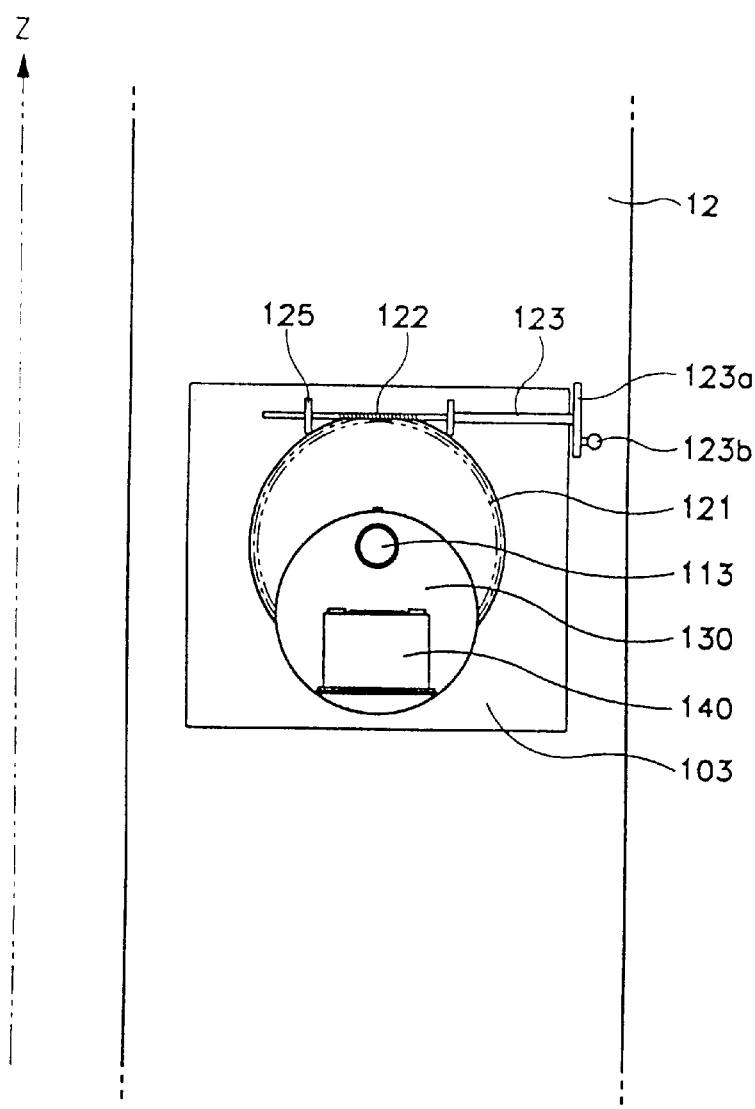
FIG. 6A to FIG. 6C are front views illustrating measuring processes of the rotating angle measuring device according to the present invention.

First, a mounting step for mounting the holder 101 on the robot perpendicularly is performed. As shown in FIGS. 3 and 6a, the measuring device 100 is mounted on the robot by inserting the screws 105 protruded from the rear surface of the mounting plate 102 into the inserting holes 12a of the link 12 having the appropriate size and position for each screw 105.

Second, an initial value of the electronic level 140 should be set (generally, zero-setting) so as to provide a datum for operation of the rotary encoder 110. In order to perform such an initial value setting step, if a user rotates the knob 123b provided on the rod 123, the worm wheel 121 toothed with the worm 122 is also rotated, and then the encoder shaft 113 coupled to the worm wheel 121 and the rotating plate 130 coupled to the encoder shaft 113 are rotated together. Accordingly, the electronic level 140 fixed to the rotating plate 130 is rotated on the encoder shaft 113. By this method, the initial value of the electronic level 140 can be set in such a manner that the damping oscillator thereof is located in the middle of two sensors thereof and the potential difference generated in the sensors is zero. Such a zero-setting state of the electronic level 140 functions as a datum for operation of the rotary encoder 110.

Figure 6B:
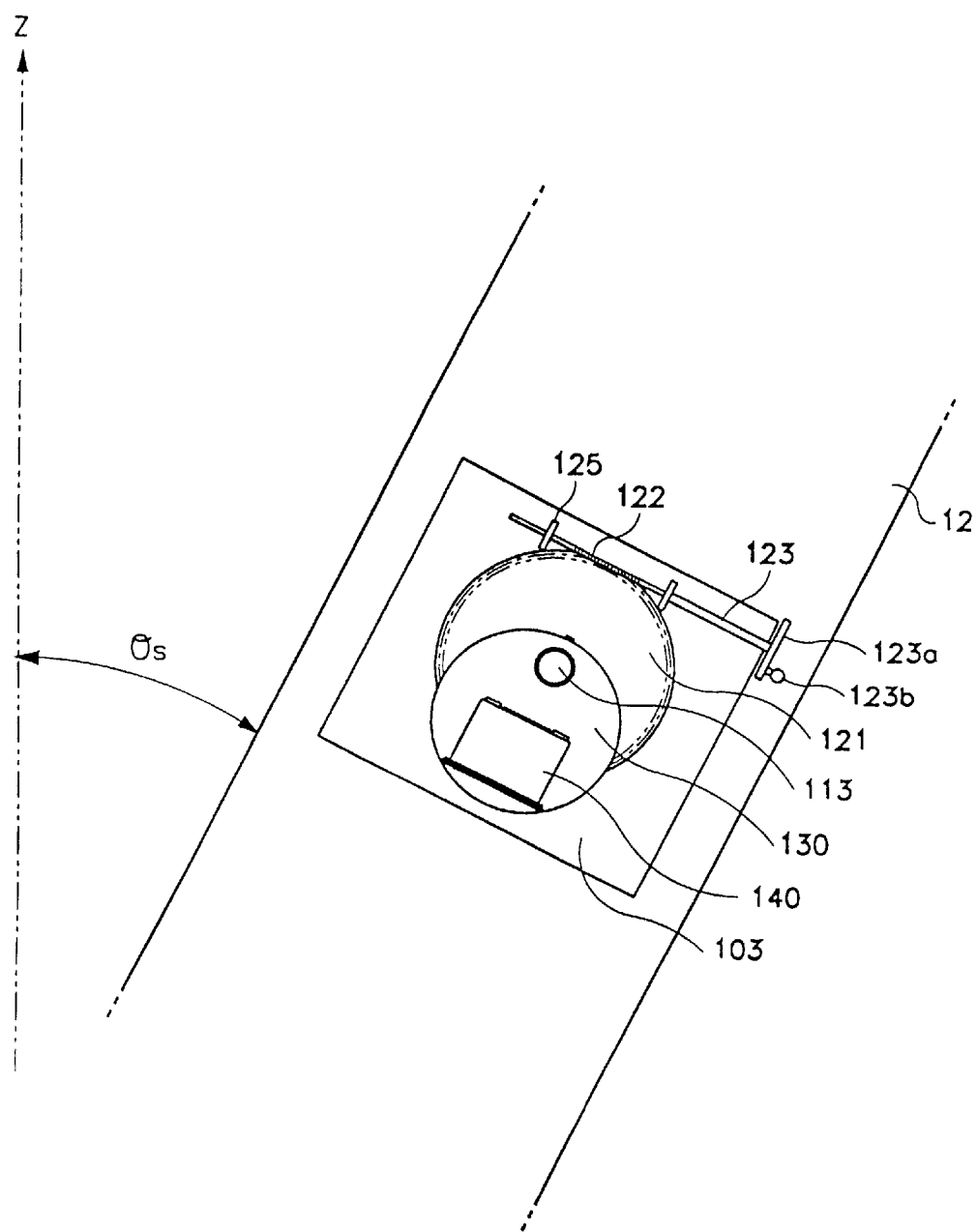
Figure 6C:
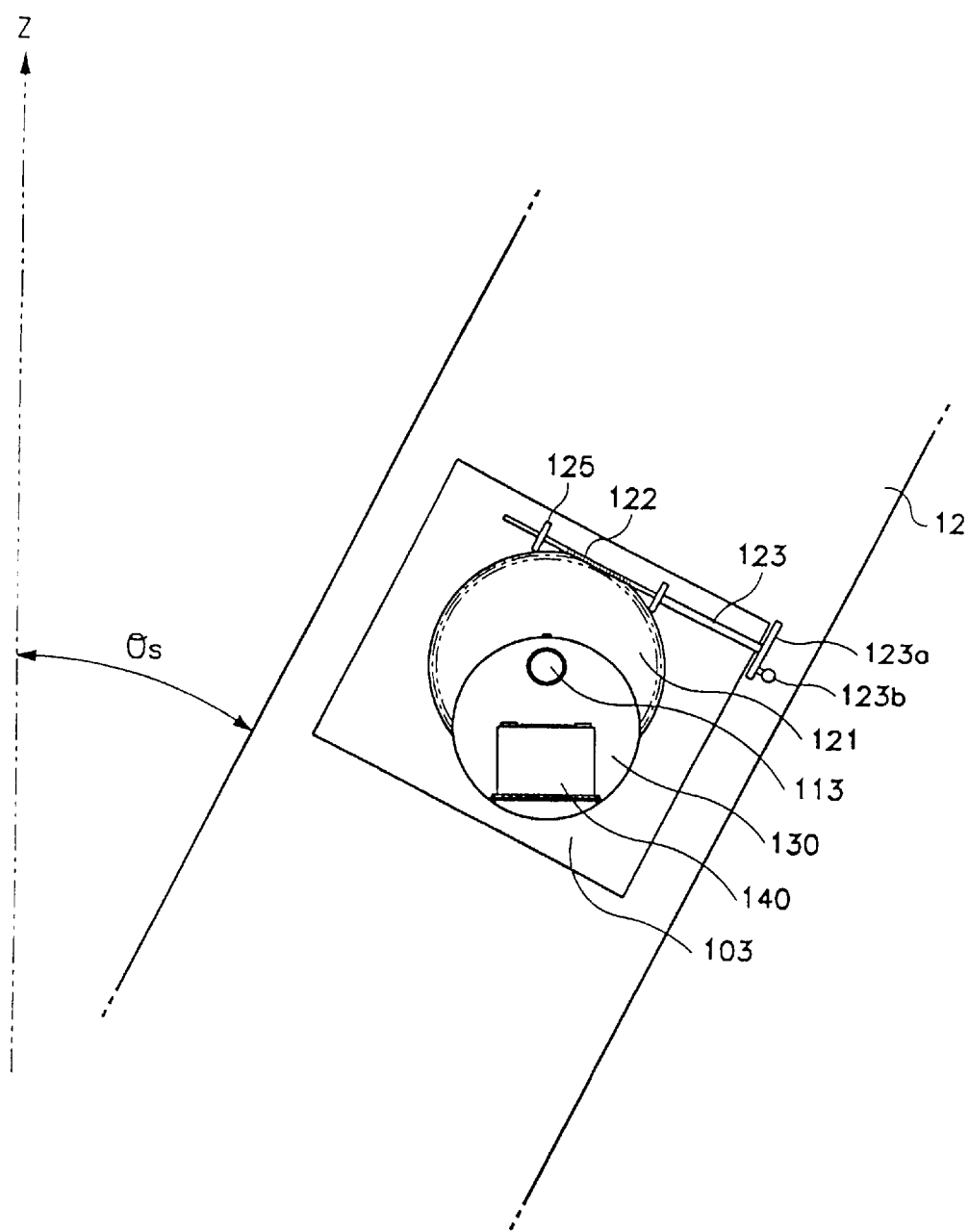

In this state, as shown in FIG. 6b, when the second link 12 of the robot is rotated from the Z-axis at a target rotating angle θs which the user wants, the potential difference generated in the sensors of the electronic level 140 mounted to the link 12 shows a certain value. After the above rotating step, an initial value returning step is performed in such a manner that the user rotates the worm wheel 121 toothed with the worm 122 and the rotating plate 130 by using the knob 123b provided to the rod 123 so as to return the electronic level 140 to the initial position, that is, the zero-setting state as shown in FIG. 6c. During the initial value returning step, the encoder shaft 113 coupled to the worm wheel 121 is also rotated until the electronic level 140 is returned to the zero-setting state. After that, a measuring step in which the rotary encoder 110 measures the rotating angle of the shaft 113 and displays it on the displaying part is performed. In such a measuring step, the value of the rotating angle measured by the rotary encoder 110 means the rotating angle at which the second link 12 is rotated practically.

In other words, if the second link 12 of the robot is exactly rotated at the target rotating angle θs, the rotating angle of the shaft 113 measured by the rotary encoder 110 during the initial value returning step and the measuring step is identical with the target rotating angle θs of the second link 12. But, if the second link 12 is rotated with missing the target angle θs to an error, the rotating angle of the shaft 113 measured by the rotary encoder 110 shows the value of 'target rotating angle θs±error'.

Finally, a compensating step is performed, in which the practical rotating angle of the second link 12 measured in the measuring step is analyzed and a deviation between the target rotating angle and the practical rotating angle is calculated and compensated by a controller (not shown).

As a result, the robot can be applied to a high-precision work by being compensated through a series of rotating angle measuring methods according to the present invention.

Figure 7:
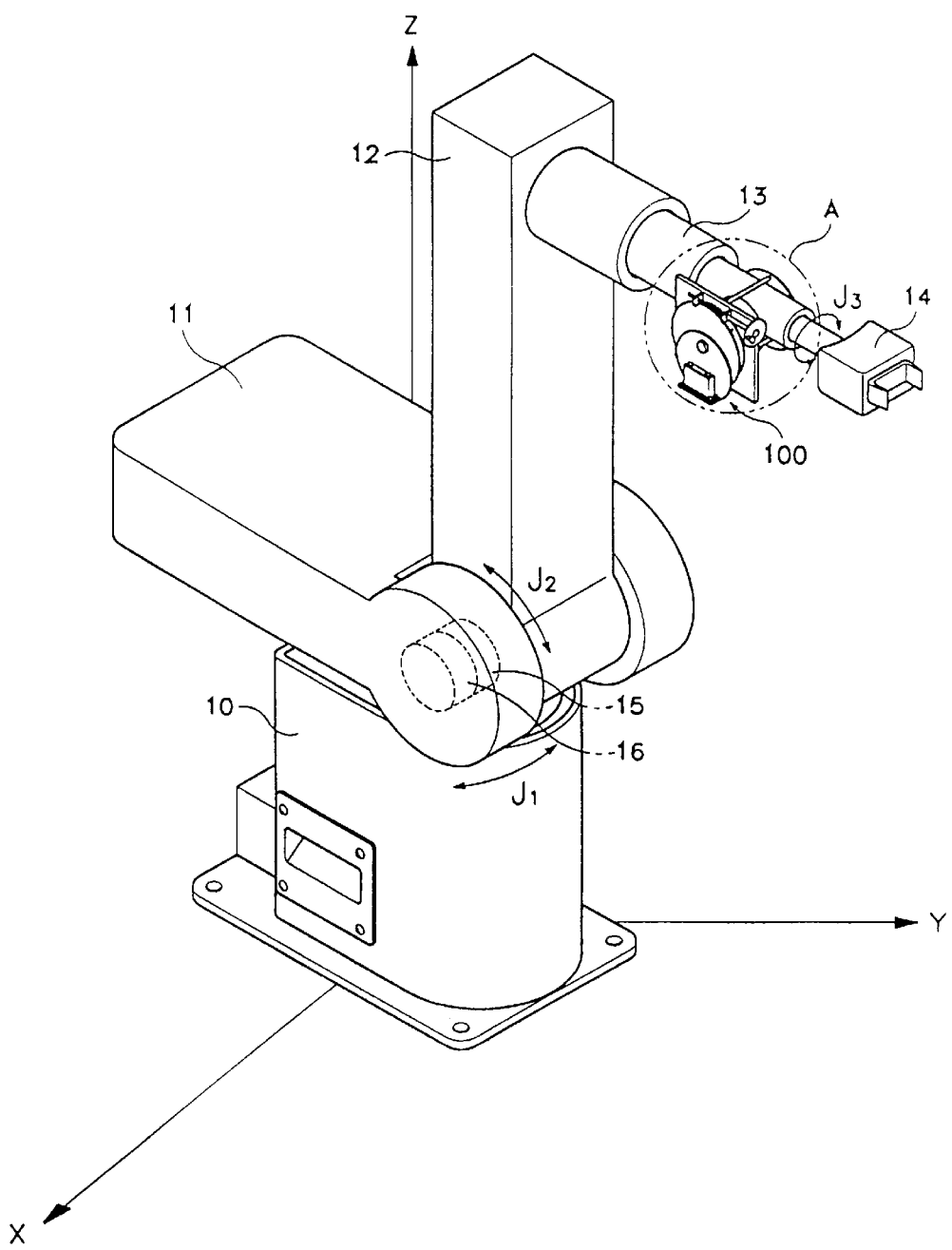
FIG. 7 is a perspective view illustrating a robot on which a rotating angle measuring device for a rotary object according to another preferred embodiment of the present invention is mounted.
Figure 8:
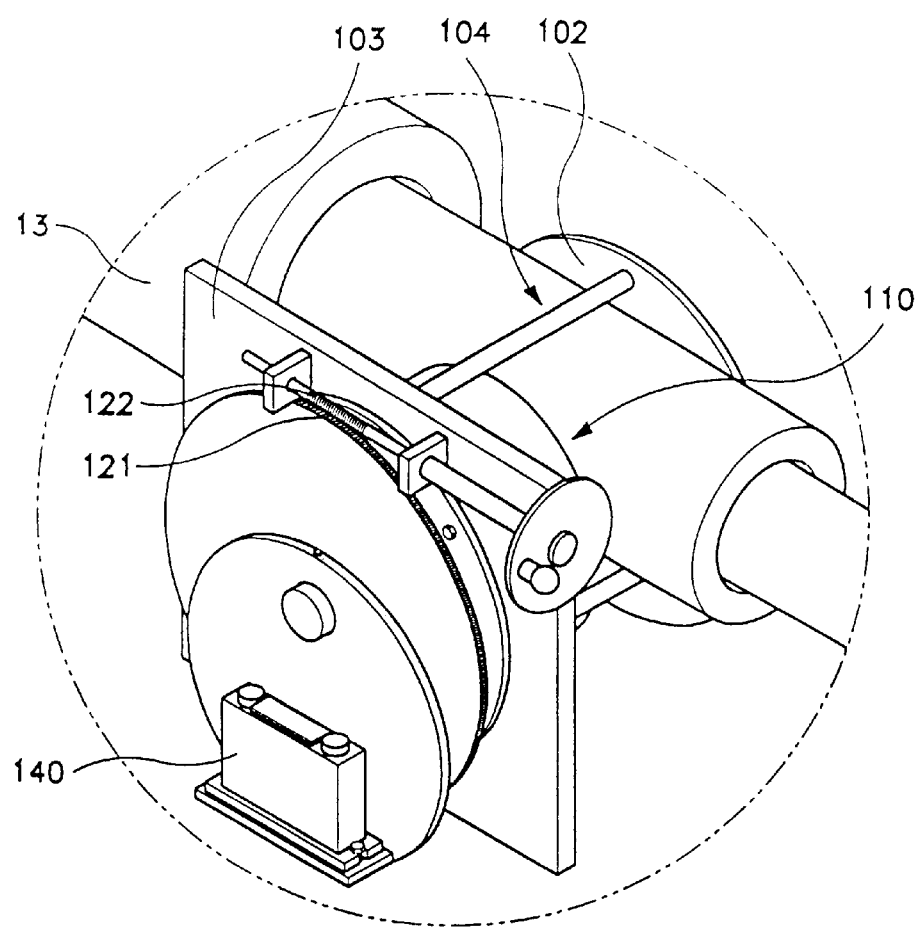
FIG. 8 is an enlarged view of a portion in FIG. 7.

The measuring device 100 of the present invention is designed to be mounted on the robot by inserting the screws 105 provided for the mounting plate 102 into the inserting holes 12a of the second link 12 as described above. However, it may happen that no holes are generated on the link due to the shape of the robot. In this circumstance, as shown in FIGS. 7 and 8, the supporting plate 103 (to which the rotary encoder 110, the worm 122, the worm wheel 121 and the electronic level 140 are mounted) is initially located in front of the third link 13, and the mounting plate 102 is then initially located behind the link 13. Then, the supporting plate 103 and the mounting plate 102 are connected to each other by the connecting bars 104, thereby mounting the measuring device 100 to the third link 13. The above mounting method can be easily achieved by using connecting bars 104 having appropriate lengths.

Furthermore, the rotating angle measuring device 100 of the present invention can measure the rotating angle θr of the end effector 14 accurately as well as the rotating angle θs of the second link 12 by the above measuring method.

As described above in detail, according to the rotating angle measuring device and method for a rotary object of the present invention, a minute rotating angle of a rotary object applied to a high-precision work, such as a link or an end effector of a robot, can be measured more accurately and an error of rotation can be compensated.

Also, the measuring device of the present invention can be easily mounted to rotary objects having various shapes.

What is claimed is:

1. A rotating angle measuring device for measuring a rotating angle of a rotary object comprising:
    a holder mounted detachably to the rotary object so that the holder is rotated together with the rotary object;
    a rotating angle sensor coupled to the holder and having a shaft which is rotated relative to the holder;
    a level coupled to the shaft of the rotating angle sensor which provides an initial value as a datum for operation of the rotating angle sensor at an initial position of the rotary object; and
    an operation part which rotates the shaft of the rotating angle sensor, such that after rotation of the rotary object from the initial position to a second position, a rotating angle of the shaft is measured with the rotating angle sensor by rotating the shaft using the operation part until a changed value of the level caused by the rotation of the rotary object is returned to the initial value, thereby determining a rotating angle of the rotary object.

2. A rotating angle measuring device for a rotary object as claimed in claim 1, wherein the holder comprises:
    a mounting plate which is attached to the rotary object,
    a supporting plate to which the rotating angle sensor is fixed, and
    a plurality of connecting bars which connect the supporting plate to the mounting plate.

3. A rotating angle measuring device for a rotary object as claimed in claim 1, wherein the operation part includes:
    a worm which is provided to the holder, and
    a worm wheel which is toothed with the worm and which is coupled to the shaft of the rotating angle sensor so as to be rotated together with the shaft by rotation of the worm, the shaft passing through the center portion of the worm wheel.

4. A rotating angle measuring device for a rotary object as claimed in claim 3:
    wherein a rotating plate, through which the shaft of the rotating angle sensor is passed, is attached to the worm wheel so as to be rotated together with the shaft by a driving of the worm and the worm wheel; and
    wherein the level is mounted fixedly to the rotating plate.

5. A rotating angle measuring device for a rotary object as claimed in claim 4, wherein one end of the worm includes a driving plate for rotating the worm and a knob protruded from a surface of the driving plate.

6. A rotating angle measuring device for a rotary object as claimed in claim 1, wherein the rotating angle sensor is a rotary encoder.

7. A method for measuring a rotating angle of a rotary object comprising the steps of:
    mounting a rotating angle sensor and a level to the rotary object, with the level being coupled to a shaft of the rotating angle sensor and rotated together with the shaft;
    setting an initial value of the level at an initial position of the rotary object;
    rotating the rotary object at a target rotating angle from the initial position to a second position;
    returning a changed value of the level due to the rotating step to the initial value by rotating the level; and
    measuring a practical rotating angle of the rotary object from the initial to the second position by measuring with the rotating angle sensor the rotating angle of the shaft which is rotated together with the level during the returning step.

8. A rotating angle measuring method for a rotary object as claimed in claim 7, wherein the method further comprises a compensating step after the measuring step, in which the practical rotating angle of the rotary object measured in the measuring step is analyzed and a deviation between the target rotating angle and the practical rotating angle is calculated and compensated for.

* * * * *